US007269349B2

United States Patent
Kinjo et al.

(10) Patent No.: US 7,269,349 B2
(45) Date of Patent: Sep. 11, 2007

(54) METHOD OF AND DEVICE FOR PERFORMING BI-DIRECTIONAL TRANSMISSION USING A SINGLE-WIRE

(75) Inventors: Kaoru Kinjo, Tokyo (JP); Satoshi Kajiya, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 614 days.

(21) Appl. No.: 10/124,348

(22) Filed: Apr. 18, 2002

(65) Prior Publication Data

US 2003/0081290 A1 May 1, 2003

(30) Foreign Application Priority Data

Oct. 30, 2001 (JP) .............................. 2001-332603

(51) Int. Cl.
H04B 10/08 (2006.01)
H04J 14/02 (2006.01)

(52) U.S. Cl. ............................ 398/27; 398/42; 398/92; 398/157; 398/72

(58) Field of Classification Search .............. 359/341, 359/114, 334, 341.2, 341.3; 398/79, 72, 398/120, 37, 82–97, 177, 157, 27, 67; 341/341
See application file for complete search history.

(56) References Cited

U.S. PATENT DOCUMENTS

| 5,452,124 | A | * | 9/1995 | Baker ....................... 359/341.2 |
| 5,546,221 | A | * | 8/1996 | Harasawa ............... 359/341.44 |
| 5,801,858 | A | * | 9/1998 | Roberts et al. ................ 398/97 |
| 5,812,306 | A | | 9/1998 | Mizrahi ....................... 359/341 |
| 6,091,542 | A | | 7/2000 | Yang ........................... 359/341 |
| 6,094,296 | A | * | 7/2000 | Kosaka ................... 359/341.41 |
| 6,212,000 | B1 | | 4/2001 | Ishikawa ..................... 359/341 |
| 6,683,712 | B2 | * | 1/2004 | Tanaka et al. ............ 359/341.3 |
| 6,701,089 | B1 | * | 3/2004 | Goodwin et al. .............. 398/79 |
| 6,775,057 | B2 | * | 8/2004 | Akasaka et al. .......... 359/337.5 |
| 6,941,074 | B2 | * | 9/2005 | Nakamura et al. ............ 398/92 |
| 6,970,650 | B2 | * | 11/2005 | Kajiya et al. .................. 398/92 |

FOREIGN PATENT DOCUMENTS

| JP | 58-84550 A | 5/1983 |
| JP | 58-170138 A | 10/1983 |
| JP | 2-281774 A | 11/1990 |
| JP | 10-73852 A | 3/1998 |
| JP | 2000-59308 A | 2/2000 |
| JP | 2001-230480 A | 8/2001 |
| KR | 90-008601 B1 | 11/1990 |

* cited by examiner

Primary Examiner—Leslie Pascal
(74) Attorney, Agent, or Firm—Birch, Stewart, Kolasch & Birch, LLP

(57) ABSTRACT

Two signal lights having different wavelengths are bidirectionally transmitted on an optical-fiber transmission-line. A Raman pump light source generates a first Raman pump light having predetermined wavelengths with a Raman gain-bandwidth for amplifying the first signal light and without response to the second signal light. Another Raman pump light source generates a second Raman pump light having predetermined wavelengths with a Raman gain-bandwidth for amplifying the second signal light and without response to the first signal light. The first Raman pump light and the second Raman pump light are differently injected from respective input/output terminals into the optical-fiber transmission-line by optical combining and branching filters.

8 Claims, 8 Drawing Sheets

METHOD OF AND DEVICE FOR PERFORMING BI-DIRECTIONAL TRANSMISSION USING A SINGLE-WIRE

FIELD OF THE INVENTION

The present invention relates to a method of and device for performing bi-directional transmission using a single-wire which make use of the effect of Raman amplification.

BACKGROUND OF THE INVENTION

Generally, amplitudes of signal lights are attenuated by losses on an optical-fiber transmission-line in the case of optical fiber transmission communication between two points. The attenuation in the amplitudes of signal lights is one of factors for deterioration in the signal light quality at a receiving terminal. A transmission method for realizing transmission between two points under compensation for losses in signal lights in order to prevent deterioration in signal quality caused by attenuation in the amplitudes of signal lights is called an optical amplification transmission method.

As compared with the optical amplification transmission method, a transmission method for realizing transmission between arbitrary two points without recovery of attenuated amplitudes of signal lights in the middle of transmission is called as a nonrepeartered transmission method. The nonrepeartered transmission method has an advantage that a transmission system may be established at more reduced cost than that of the optical amplification transmission method, as there is nonrepeartered transmission in the middle of transmission.

Now, the optical-fiber nonrepeartered transmission method will be described, referring to FIG. 7 to FIG. 11. Here, FIG. 7 is a view which shows a relation between the span loss and the received-signal to noise ratio ("received SNR") in optical-fiber nonrepeartered transmission. FIG. 8 is an explanatory view of Raman gain-bandwidth generated by a Raman pump light. FIG. 9A and FIG. 9B are explanatory views of Raman amplification. FIG. 10 is a configuration example of a nonrepeartered transmission system where the Raman amplification effect is applied. FIG. 11 is an explanatory view of Raman amplification effect in the system shown in FIG. 10.

In FIG. 7, the vertical axis shows received SNR (dB), and the resolution is @ 0.1 nm. The horizontal axis shows span loss (dB). The longest transmission distance in the nonrepeartered transmission system largely depends on the losses on the transmission line and the transmission input power. Generally, obtaining a received SNR of 15.6 dB (resolution: @0.1 nm) is a criterion for accurate receiving of signal lights in the case of signal lights with a signal transmission speed of 10 Gbit/second.

That is, a received SNR of 15.6 dB or more is obtained in the case of characteristics (1) where the input transmitting power is 0 dBm/ch, when the transmission-line loss is about 37.5 dB or less. Thereby, it is shown that nonrepeartered transmission over about 150 km may be realized, when the loss on an optical-fiber transmission-line is assumed to be 0.25 dB/Km. On the other hand, the transmission-line loss becomes 42.5 dB or less in order to obtain a received SNR of 15.6 dB or more, and, accordingly, transmission over about 170 km may be realized in the case of characteristics (2) where the input transmitting power is increased by 5 dB. In a word, the transmission distance may be made longer according to the increased amount of the input power.

Moreover, when the transmission-line loss is not 0.25 dB/km, but 0.2 dB/km, transmission over a distance of 187.5 km may be realized at an input power of 0 dBm/ch, and transmission over that of 212.5 km may be done so at an input power of 5 dBm/ch.

As described above, a method for increasing the input power and a method for using optical fibers with small losses per unit length are considered to be used as a method for making the transmission distance longer in the nonrepeartered transmission. However, the increase in the input power is limited by the influence of nonlinear effects of optical fibers, and there is also a limitation in reduction in losses of the optical fibers. Therefore, application of the Raman amplification using the Raman amplification effect of the optical fibers to a method for making the distance longer in the nonrepeartered transmission has been noticed.

In the Raman amplification effect, optical fibers themselves on which signal lights are transmitted are used as an amplification medium, and crystal lattice vibration of the material forming the optical fibers is caused by pump lights launched into the optical fibers. At this time, induced amplification of scattered lights, called Stokes lights, is performed by the interaction with the optical phonons caused by the crystal lattice vibration to a frequency shifted to a shorter frequency by a certain proper amount than frequency of pump light. The amplification gain caused by the Raman amplification effect depends on the material of the optical fibers, and, generally, has a Raman gain-bandwidth shown in FIG. 8. That is, the horizontal axis shows wavelength (nm), and the vertical axis shows Raman gain coefficients in FIG. 8. As shown in this figure, a wavelength at which the maximum gain is obtained is a wavelength 100 nm-110 nm away from the pump wavelength. The gain-bandwidth lies in a wavelength range over about 60 nm in a long skirt extending over the side of the shorter wavelength from the center wavelength causing the maximum gain.

A method (called as forward pump) for entry of pump lights in the same direction to the propagating one of the signal lights, and a method (called as backward pump) for entry of pump lights in the opposite direction to the propagating one of the signal lights are used as a method for entry of the pump lights for the Raman amplification. FIG. 9A and FIG. 9B each show a relation between the power of the signal light (Signal Power (dBm)) and the power of the pump light (Pump power (W)) to the distance (Distance) when the Raman amplification has been performed on an optical fiber with a length of 100 km. FIG. 9A is for the forward pump, and FIG. 9B is for the backward pump. In FIGS. 9A, 9B, the characteristics (a) show power characteristics of the signal lights, and the characteristic values can be read at the left-side vertical axis (signal light power (Signal Power (dBm)) shown by an arrow pointing to the left side. And, the characteristics (b) show power characteristics of the pump lights, and the characteristic values can be read at the right-side vertical axis (pump light power (Pump Power (W)) shown by an arrow pointing to the right side.

As the Raman amplification effect depends on the power of the pump lights, and the power of the pump lights are attenuated by the fiber losses, the Raman amplification gain is gradually reduced along with increase in the propagation distance. Accordingly, in the case of the forward pump scheme, the signal lights are amplified as the power of the pump lights is large near at the entry terminal, and the signal lights are decreased as the signal lights approach the emitting terminal (receiving terminal) as shown in FIG. 9A. Conversely, in the case of the backward pump scheme, the Raman amplification gain is almost zero as the power of the pump lights is small near at the entry terminal of the signal lights, and the signal lights are amplified due to the large power of the pump lights as the signal lights approach the emitting terminal (receiving terminal) as shown in FIG. 9B. Moreover, it has been generally known in the case of comparison between the forward pump scheme and the backward pump scheme that the amount of crosstalks caused by influence of the pump lights on the signal lights is more advantageously smaller for the backward pump scheme.

Now, a uni-directional and nonrepeartered transmission system where Raman amplification by backward pump is applied will be described, referring to FIG. 10. as shown in FIG. 10, a transmitter 91 is provided at one terminal of an optical-fiber transmission-line 90, and a wavelength-selection-type optical combining and branching filter 92 is provided at the other terminal of the optical-fiber transmission-line 90. A receiver 94 is connected to the optical combining and branching filter 92 through an optical isolator 93, and a Raman pump light source 95 is also connected to the filter 92.

A signal light S output from the transmitter 91 is entered from the one terminal of the optical-fiber transmission-line 90, and transmitted on the optical-fiber transmission-line 90 along the first transmission direction D1 toward the receiver 94. On the other hand, a Raman pump light P generated in the Raman pump light source 95 is entered into the optical-fiber transmission-line 90 from the other terminal through the optical combining and branching filter 92, and transmitted on the optical-fiber transmission-line 90 along the second transmission direction D2 toward the transmitter 91. The signal light S propagating on the optical-fiber transmission-line 90 in the first transmission direction D1 reaches the other terminal of the optical-fiber transmission-line 90, as the signal light S is gradually amplified by the Raman amplification effect of the Raman pump light P propagating in the second transmission direction D2, and is taken into the receiver 94 through the optical combining and branching filter 92, and the optical isolator 93.

The Raman amplification effect in the system shown in FIG. 10 will be described, referring to FIG. 11. FIG. 11 shows relations of the power of the signal lights (Signal Power) to the distance (Distance) of the optical-fiber transmission-line without the Raman amplification and with the Raman amplification (the power of the Raman pump lights: 25 dBm), when it is assumed that the signal transmission speed is 10 Gbit/second, and the transmission-line loss is 0.25 dB/km.

In FIG. 11, the characteristics (1) show the power characteristics without the Raman amplification, and the characteristics (2) indicate the power characteristics with the Raman amplification. In the case of no Raman amplification, the power of the signal lights linearly decrease according to increase in the transmission distance, as shown in the characteristics (1). It is shown that the point B of the characteristics (1) indicates the minimum receiving level (−37.5 dBm/ch), and the longest transmission distance realizing a received SNR of 15.6 dB or more is 150 km.

On the other hand, the signal lights are more amplified as the signal lights approach the receiving terminal in the case of Raman amplification by the backward pump, and accordingly, the power of the signal lights get out of the decreasing tendency, changes to the increasing tendency as the transmission distance increases, shows a receiving level of −32.5 dBm/ch at the point A corresponding to the point B, and further increases toward the receiving terminal, as shown in the characteristics (2). The difference of 5 dB between the minimum receiving levels of the point A and point B is the Raman amplification effect. In a word, it is shown that the longest transmission distance realizing a received SNR of 15.6 dB or more is 170 km in the case of the Raman amplification. As described above, the transmission distance may be made longer according to the difference in the minimum receiving levels under the Raman amplification, comparing with that of a case with no Raman amplification.

It is usual in optical communication systems to perform not only communication in the only one direction, but also communication in the opposite direction. A method for providing single-wire optical-fiber transmission-lines for each uni-directional communication, that is a method for providing two-wire optical-fiber transmission-line, and a single-wire bi-directional transmission method for realizing bi-directional optical communication on a single-wire optical-fiber transmission-line are used as a method for realizing bi-directional optical communication.

The single-wire bi-directional transmission method is excellent in system establishment at reduced cost, and soon, as efficiency in use of optical fibers maybe improved, and the number of optical fibers may be reduced. Moreover, as understood from the description, it may be that it is preferable to apply the Raman amplification in order to make the transmission distance longer when a nonrepeartered transmission system using a single-wire bi-directional transmission method is established. Even the forward pump method is basically acceptable, the backward pump method is recommended as an pump method, considering the transmission characteristics.

Following problems exist in the single-wire bi-directional transmission method where the Raman amplification by backward pump is applied. These problems will be explained while referring to FIG. 12. FIG. 12 shows an example of configuration in which single-wire and bi-directional transmission is realized by application of the Raman amplification based on backward pump in a nonrepeartered transmission system.

As shown in FIG. 12, a wavelength-selection type optical combining and branching filter 101 is connected to one input/output terminal of an optical-fiber transmission-line 100, and a wavelength-selection-type optical combining and branching filter 102 is connected to the other input/output terminal of the optical-fiber transmission-line 100.

An input/output terminal 103 and an optical isolator 104 are connected to the optical combining and branching filter 101. A transmitter and a receiver which are not shown are connected to the input/output terminal 103. A Raman pump light source 106 is connected to the optical isolator 104. An input/output terminal 107 and an optical isolator 108 are connected to the optical combining and branching filter 102. A transmitter and a receiver which are not shown are connected to the input/output terminal 107. A Raman pump light source 109 is connected to the optical isolator 108.

The first signal light S01 input to the input/output terminal 103 from the not-shown transmitter, and the first Raman pump light P01 generated in the Raman pump light source 106 are combined in the optical combining and branching filter 101, and are transmitted on the optical-fiber transmission-line 100 along the first transmission direction D1 toward the other input/output terminal. On the other hand, the second signal light S02 input to the input/output terminal 107 from the not-shown transmitter, and the second Raman pump light P02 generated in the Raman pump light source 109 are combined in the optical combining and branching filter 102, and are transmitted on the optical-fiber transmission-line 100 along the second transmission direction D2 toward one input/output terminal. The object of the first Raman pump light P01 is amplification of the second signal light S02, and the object of the second Raman pump light P02 is amplification of the first signal light S01. Moreover, it is assumed that the center wavelengths of the first signal light S01 and the second signal light S02 lie in Raman gain-bandwidths uniquely defined according to each pump wavelength of the first Raman pump light P01 and the second Raman pump light P02.

The Raman amplification effect for the first Raman pump light P01 over a short distance step on the optical-fiber transmission-line 100 is shown by the following equations (1) to (3). In these equations, $S_{01}$: the first signal light, $S_{02}$: the second signal light, $P_{01}$: the first Raman pump light, $P_{02}$: the second Raman pump light, $g_R$: a Raman gain coefficient, $\omega_{s01}$: the center frequency of the first signal light, $\omega_{s02}$: the center frequency of the second signal light, $\omega_{P01}$ the center frequency of the first Raman pump light, $\omega_{P02}$: the center frequency of the second Raman pump light, $\alpha_{S01}$: a loss coefficient of the first signal light on an optical-fiber transmission-line, $\alpha_{S02}$: a dissipation coefficient of the second signal light on an optical-fiber transmission-line, and $\alpha_{P01}$: a dissipation coefficient of the first pump light on an optical-fiber transmission-line.

$$\frac{dS_{01}}{dz} = g_R P_{01} S_{01} - \alpha_{S01} S_{01} \quad (1)$$

$$\frac{dS_{02}}{dz} = g_R P_{01} S_{02} - \alpha_{S02} S_{02} \quad (2)$$

$$\frac{dP_{01}}{dz} = -\frac{\omega_{P01}}{\omega_{S01}} g_R P_{01} S_{01} - \frac{\omega_{P01}}{\omega_{S02}} g_R P_{01} S_{02} - \alpha_{P01} P_{01} \quad (3)$$

As understood from the equations (1) to (3), the Raman pump light is consumed in proportion to the product of the power strength of the signal light and the power strength of the pump light in the Raman amplification effect, when the signal light exists within the Raman gain-bandwidth uniquely defined by the wavelength of the Raman pump light. That is, there is much more consumption in the strength of the Raman pump light caused by a signal light with stronger power strength than that of a signal light with weaker power strength, when the signal light with strong power strength and the signal light with weak power strength are entered into the transmission line 100 at the same time.

Therefore, in FIG. 12, the power of the Raman pump light is greatly consumed by amplifying the first signal light S01 transmitted in the first transmission direction D1 with regard to the first Raman pump light P01 originally to amplify the second signal light S02, as the power strength of the first signal light S01 is stronger than that of the second signal light S02 in the vicinity of the output terminal of combined lights of the optical combining and branching filter 101, where the first Raman pump light P01 is injected into the optical-fiber transmission-line 100. Accordingly, the power of the first Raman pump light P01 for amplifying the second signal light S02 is lost, and it becomes impossible to obtain desired receiving characteristics for the second signal light S02.

Similarly, the power of the Raman pump light is greatly consumed by amplifying the second signal light S02 transmitted in the second transmission direction D2 with regard to the second Raman pump light P02 originally to amplify the first signal light S01, as the power strength of the second signal light S02 is stronger than that of the first signal light S01 in the vicinity of the output terminal of combined lights of the optical combining and branching filter 100, where the second Raman pump light P02 is injected into the optical-fiber transmission-line 100. Accordingly, the power of the second Raman pump light P02 for amplifying the first signal light S01 is lost, and it becomes impossible to obtain desired receiving characteristics for the first signal light S01.

SUMMARY OF THE INVENTION

It is an object of the present invention is to obtain a method of and device for performing bi-directional transmission capable of making the transmission distance of the nonrepeartered transmission system longer by applying the Raman amplification so as to obtain desired receiving characteristics for bi-directional communication.

The single-wire bi-directional transmission device according to one aspect of this invention comprises an optical-fiber transmission-line on which a first signal light is transmitted in a first transmission direction from one input/output terminal toward the other input/output terminal, and a second signal light with a different wavelength from that of the first signal light is transmitted in a second transmission direction opposite to the first transmission direction, a first Raman pump light source which generates a first Raman pump light having predetermined wavelengths with a Raman gain-bandwidth for amplifying the first signal light and without a Raman gain-bandwidth for amplifying the second signal light, a first injection unit which injects the first Raman pump light from either of the one input/output terminal, or the other input/output terminal into the optical-fiber transmission-line, a second Raman pump light source which generates a second Raman pump light having predetermined wavelengths with a Raman gain-bandwidth for amplifying the second signal light, and without a Raman gain-bandwidth for amplifying the first signal light, and a second injection unit which injects the second Raman pump light from the other one of either of the one input/output terminal, or the other input/output terminal into the optical-fiber transmission-line. Therefore, the first signal light is transmitted toward the other input/output terminal under optical amplification by the first Raman pump light, while the second signal light is transmitted toward one input/output terminal under optical amplification by the second Raman pump light.

In the single-wire bi-directional transmission method according to another aspect of this invention, on an optical-fiber transmission-line, a first signal light is transmitted from one input/output terminal toward the other input/output terminal, and a second signal light with a different wavelength from that of the first signal light is transmitted from the other input/output terminal toward the one input/output terminal. A first Raman pump light having predetermined wavelengths with a Raman gain-bandwidth for amplifying the first signal light and without a Raman gain-bandwidth for amplifying the second signal light, and a second Raman pump light having predetermined wavelengths with a Raman gain-bandwidth for amplifying the second signal light and without a Raman gain-bandwidth for amplifying the first signal light, are respectively injected from different input/output terminals into said optical-fiber transmission-line. Therefore, the first signal light is transmitted toward the other input/output terminal under optical amplification by the first Raman pump light, while the second signal light is transmitted toward one input/output terminal under optical amplification by the second Raman pump light.

Other objects and features of this invention will become apparent from the following description with reference to the accompanying drawings.

DETAILED DESCRIPTIONS

Embodiments of the single-wire bi-directional transmission device according to this invention will be explained in detail below, referring to the accompanying drawings.

Figure 1:
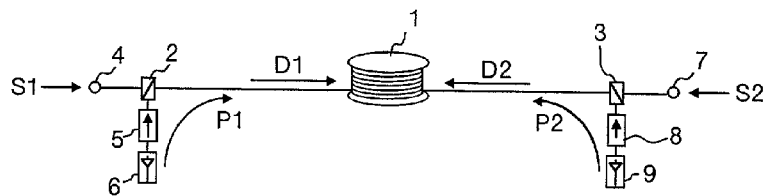
FIG. 1 shows a configuration of a single-wire bi-directional transmission device according to a first embodiment of this invention.

A first embodiment of this invention will be explained below. FIG. 1 is a view of a configuration of a single-wire bi-directional transmission device according to the first embodiment of this invention. FIG. 1 shows a configuration example of a single-wire bi-directional transmission device to which Raman amplification by backward pump is applied.

As shown in FIG. 1, a wavelength-selection-type optical combining and branching filter 2 is connected to one input/output terminal of an optical-fiber transmission-line 1, and a wavelength-selection-type optical combining and branching filter 3 is connected to the other-input/output terminal.

An input/output terminal 4 and an optical isolator 5 are connected to the optical combining and branching filter 2. A transmitter and a receiver which are not shown are connected to the input/output terminal 4. A Raman pump light source 6 is connected to the optical isolator 5. An input/output terminal 7 and an optical isolator 8 are connected to the optical combining and branching filter 3. A transmitter and a receiver which are not shown are connected to the input/output terminal 7. A Raman pump light source 9 is connected to the optical isolator 8.

A first signal light S1 is input from a not-shown transmitter to the input/output terminal 4. A second signal light S2 is input from another not-shown transmitter to the input/output terminal 7. The first signal light S1 and the second signal light S2 have different wavelengths from each other. For example, it is configured that an arbitrary wavelength within the range of 1530 nm to 1565 nm, which is called as a C band (Conventional Band), is selected for one signal light, and an arbitrary wavelength within the range of 1565 nm to 1625 nm, which is called as an L band (Long Wavelength Band), is selected for the other signal light.

The Raman pump light source 6 generates a first Raman pump light P1. The first Raman pump light P1 is an pump light having predetermined wavelengths with a Raman gain-bandwidth for amplifying the wavelength of the second signal light S2, and without a Raman gain-bandwidth for amplifying the wavelength of the first signal light S1. The first Raman pump light P1 generated by the Raman pump light source 6 is input to the optical combining and branching filter 2 through the isolator 5. The isolator 5 is provided for preventing the signal light output from the optical combining and branching filter 2 entering into the Raman pump light source 6.

The Raman pump light source 9 generates a second Raman pump light P2. The second Raman pump light P2 is an pump light having predetermined wavelengths with a Raman gain-bandwidth for amplifying the wavelength of the first signal light S1, and without a Raman gain-bandwidth for amplifying the wavelength of the second signal light S2. The second Raman pump light P2 generated by the Raman pump light source 9 is input to the optical combining and branching filter 3 through the isolator 8. The isolator 8 is provided for preventing the signal light output from the optical combining and branching filter 3 entering into the Raman pump light source 9.

Operations of the single-wire bi-directional transmission device will be explained below. As shown in FIG. 1, the first signal light S1 input to the input/output terminal 4, and the first Raman pump light P1 generated by the Raman pump light source 6 are combined in the optical combining and branching filter 2, and are injected into one input/output terminal of the optical-fiber transmission-line 1 to be transmitted on the optical-fiber transmission-line 1 along a first transmission direction D1 toward the other input/output terminal.

At this time, as the first Raman pump light P1 does not have the Raman gain-bandwidth such that the Raman amplification effect by the first Raman pump light P1 contributes to amplification of the first signal light S1, the optical power of the first Raman pump light P1 is not reduced excluding the losses on the optical-fiber transmission-line 1. That is, the first Raman pump light P1 is transmitted with the first signal light S1 along the first transmission direction D1 toward the other input/output terminal of the optical-fiber transmission-line 1.

On the other hand, the second signal light S2 input to the input/output terminal 7 and the second Raman pump light P2 generated by the Raman pump light source 9 are combined in the optical combining and branching filter 3, and are injected into the other input/output terminal of the optical-fiber transmission-line 1 to be transmitted on the optical-fiber transmission-line 1 along a second transmission direction D2 toward one input/output terminal.

At this time, as the second Raman pump light P2 does not have the Raman gain-bandwidth such that the Raman amplification effect by the second Raman pump light P2 contributes to amplification of the second signal light S2, the optical power of the second Raman pump light P2 is not reduced excluding the losses on the optical-fiber transmission-line 1. That is, the second Raman pump light P2 is transmitted with the second signal light S2 along the second transmission direction D2 toward one input/output terminal of the optical-fiber transmission-line 1.

Accordingly, the first signal light S1 transmitted in the first transmission direction D1 is amplified to a desired light level after undergoing enough Raman amplification by the second Raman pump light P2 transmitted in the second transmission direction D2, as the first signal light S1 approaches the other input/output terminal of the optical-fiber transmission-line 1, and input to the optical combining and branching filter 3. Thereby, such a Raman-amplified first signal light S1 is output from the optical combining and branching filter 3 to the input/output terminal 7, and is taken into the not shown receiver.

Similarly, the second signal light S2 transmitted in the second transmission direction D2 is amplified to a desired light level after undergoing enough Raman amplification by the first Raman pump light P1 transmitted in the first transmission direction D1, as the second signal light S2 approaches one input/output terminal of the optical-fiber transmission-line 1, and is input to the optical combining and branching filter 2. Thereby, such a Raman-amplified second signal light S2 is output from the optical combining and branching filter 2 to the input/output terminal 4, and is taken into the not shown receiver.

Thus, according to the first embodiment, desired receiving characteristics can be obtained for bi-directional transmission, and the single-wire and bi-directional transmission using the Raman amplification can be performed, as the first signal light S1 transmitted in the first transmission direction D1 and the second signal light S2 transmitted in the second transmission direction D2 have different wavelength bands from each other, and, furthermore, the wavelength of the pump light is selected so that only the first signal light or only the second signal light is Raman-amplified. Therefore, a nonrepeartered transmission system capable of making the transmission distance longer can be established.

Figure 2:
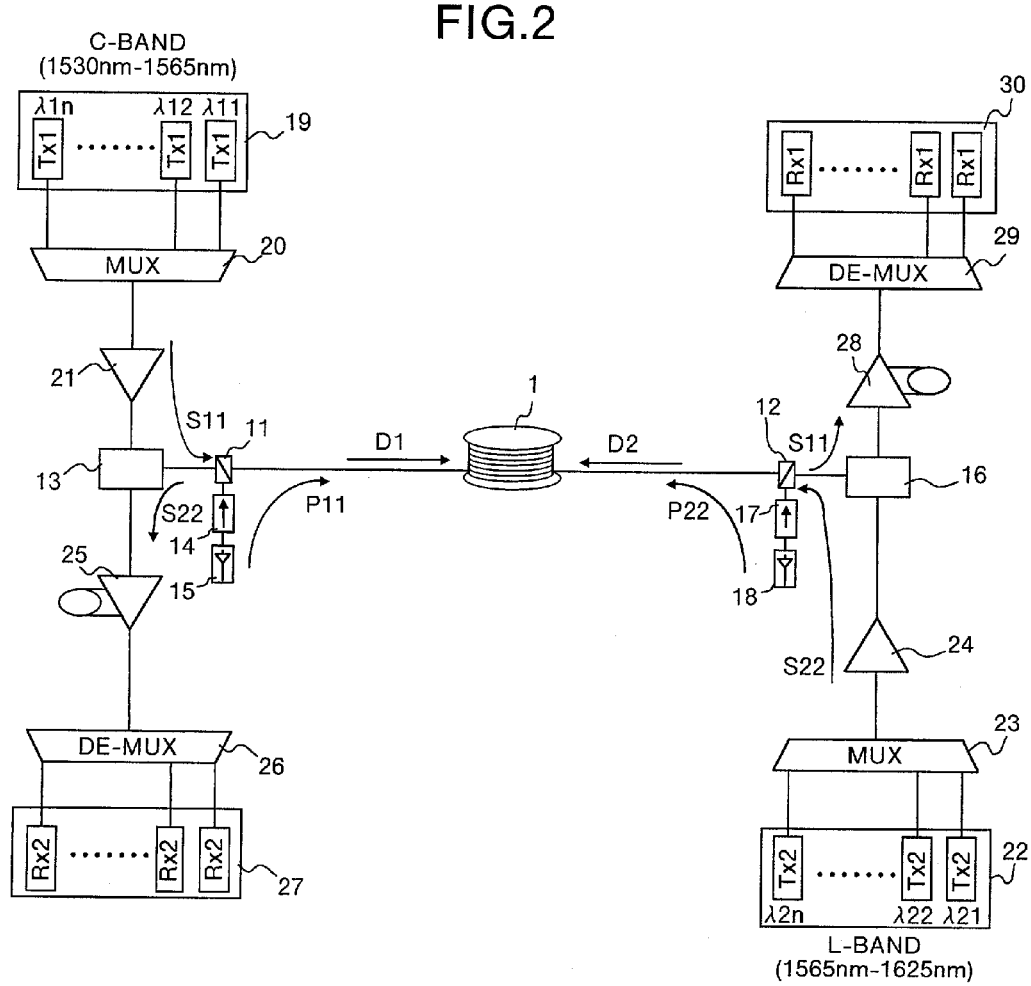
FIG. 2 shows a configuration of a single-wire bi-directional transmission device according to a second embodiment of this invention.

A second embodiment of this invention will be explained below. FIG. 2 is a view of a configuration of a single-wire bi-directional transmission device according to the second embodiment of this invention. Though it has been described in the first embodiment that the first signal light and the second signal light have single wavelengths, this second embodiment shows a configuration example where the first signal light and the second signal light are wavelength multiplexed signal lights. The pump method is backward pump in the same manner as that of the first embodiment.

As shown in FIG. 2, a wavelength-selection-type optical combining and branching filter 11 is connected to one input/output terminal Of the optical-fiber transmission-line 1, and a wavelength-selection-type optical combining and branching filter 12 is connected to the other input/output terminal.

An optical separator 13 and an optical isolator 14 are connected to the optical combining and branching filter 11. A Raman pump light source 15 is connected to the optical isolator 14. A first Raman pump light P11 generated by the Raman pump light source 15 is input to the optical combining and branching filter 11 through the optical isolator 14. Moreover, an optical separator 16 and an optical isolator 17 are connected to the optical combining and branching filter 12. A Raman pump light source 18 is connected to the optical isolator 17. A second Raman pump light P22 generated by the Raman pump light source 18 is input to the optical combining and branching filter 12 through the optical isolator 17.

An optical transmitting device 19 comprises a plurality of transmitters Tx11 to Tx1n. The transmitters Tx11 to Tx1n generate signal lights with different wavelengths ($\lambda 11$-$\lambda 1n$), respectively. The generated wavelength bands are, for example, wavelength bands of 1530 nm to 1565 nm, which are called the C band (Conventional Band). A wavelength multiplexing device (MUX) 20 combines a plurality of signal lights with different wavelengths which the optical transmitting device 19 outputs, and outputs a first wavelength multiplexed signal light S11. The generated first wavelength multiplexed signal light S11 is amplified in an optical amplifier 21, and input to the optical combining and branching filter 11 through the optical separator 13.

An optical transmitting device 22 comprises a plurality of transmitters Tx21 to Tx2n. The transmitters Tx21 to Tx2n generate signal lights with different wavelengths ($\lambda 21$ to $\lambda 2n$), respectively. The generated wavelength bands are, for example, wavelength bands of 1565 nm to 1625 nm, which are called the L band (Long Wavelength Band). A wavelength multiplexing device (MUX) 23 combines a plurality of signal lights with different wavelengths which the optical transmitting device 22 outputs, and outputs a second wavelength multiplexed signal light S22. The second wavelength multiplexed signal light S22 is amplified in an optical amplifier 24, and input to the optical combining and branching filter 12 through the optical separator 16.

A signal light (the second wavelength multiplexed signal light S22) output from the optical combining and branching filter 11 is input to an optical amplifier 25 with a dispersion compensating function through the optical separator 13, demultiplexed into signal lights with each wavelength in a wavelength demultiplexing device (DE-MUX) 26 after the amplification, and input to an optical receiving device 27. The optical receiving device 27 comprises a plurality of receivers Rx21 to Rx2n for processing reception of the signal lights with each wavelength. The optical amplifier 25 may have no dispersion compensating function.

A signal light (the first wavelength multiplexed signal light S11) output from the optical combining and branching filter 12 is input to an optical amplifier 28 with a dispersion compensating function through the optical separator 16, demultiplexed into signal lights with each wavelength in a wavelength demultiplexing device (DE-MUX) 29 after the amplification, and input to an optical receiving device 30. The optical receiving device 30 comprises a plurality of receivers Rx11 to Rx1n for processing reception of the signal lights with each wavelength. The optical amplifier 28 may have no dispersion compensating function.

The first Raman pump light P11 generated in the Raman pump light source 15 is an pump light having predetermined wavelengths with a Raman gain-bandwidth including all the wavelengths of the second wavelength multiplexed signal light S22, and with a Raman gain-bandwidth excluding all the wavelengths of the first wavelength multiplexed signal light S11. The second Raman pump light P22 generated in the Raman pump light source 18 is an pump light having predetermined wavelengths with a Raman gain-bandwidth including all the wavelengths of the first wavelength multiplexed signal light S11, and with a Raman gain-bandwidth excluding all the wavelengths of the second wavelength multiplexed signal light S22.

Operations of the single-wire bi-directional transmission device will be explained below. In FIG. 2, signal lights with a plurality of different wavelengths ($\lambda 11$ to $\lambda 1n$), which are output from the optical transmitting device 19, and are combined in the wavelength multiplexing device (MUX) 20 to become the first wavelength multiplexed signal light S11. The generated first wavelength multiplexed signal light S11 is amplified in the optical amplifier 21 so that the first wavelength signal light S11 has a desired transmitting level, and input to the optical combining and branching filter 11 through the optical separator 13. The first Raman pump light P11 output by the Raman pump light source 15 is input to the optical combining and branching filter 11 through the optical isolator 14.

The first wavelength multiplexed signal light S11 and the first Raman pump light P11, which have been input, are combined in the optical combining and branching filter 11, and injected into one input/output terminal of the optical-fiber transmission-line 1. The multiplexed signal light of the first wavelength multiplexed signal light S11 and the first Raman pump light P11, which has been entered into one input/output terminal of the optical-fiber transmission-line 1, is transmitted on the optical-fiber transmission-line 1 along the first transmission direction D1 toward the other input/output terminal.

At this time, as the Raman amplification by the first Raman pump light P11 does not contribute to the first wavelength multiplexed signal light S11, the optical power of the first Raman pump light P11 is not reduced excluding the losses on the optical-fiber transmission-line 1. The first Raman pump light P11 is transmitted with the first wavelength multiplexed signal light S11 along the first transmission direction D1 toward the other input/output terminal of the optical-fiber transmission-line 1.

Accordingly, the first wavelength multiplexed signal light S11 transmitted in the first transmission direction D1 is amplified to a desired light level after undergoing enough Raman amplification by the second Raman pump light P22 transmitted in the second transmission direction D2, as the first wavelength multiplexed signal light S11 approaches the other input/output terminal of the optical-fiber transmission-line 1, and input to the optical combining and branching filter 12. Such a Raman-amplified first wavelength multiplexed signal light S11 is input to the optical amplifier 28 from the optical combining and branching filter 12 through the optical separator 16, optically amplified to a desired receiving level, and demultiplexed into signal lights with each wavelength in the wavelength demultiplexing device (DE-MUX) 29 for processing reception of each signal light in the plurality of receivers Rx11 to Rx1n which are provided in the optical receiving device 30. The signal lights output from the optical combining and branching filter 12 to the optical isolator 17 are blocked in the optical isolator 17, and is not input to the Raman pump light source 18.

Similarly, signal lights with a plurality of different wavelengths ($\lambda 21$ to $\lambda 2n$), which are output from the optical transmitting device 22, are combined in the wavelength multiplexing device (MUX) 23, and become the second wavelength multiplexed signal light S22. The generated second wavelength multiplexed signal light S22 is amplified in the optical amplifier 24 so that the second wavelength signal light S22 has a desired transmitting level, and input to the optical combining and branching filter 12 through the optical separator 16. The second Raman pump light P22 output from the Raman pump light source 18 is input to the optical combining and branching filter 12 through the optical isolator 17.

The second wavelength multiplexed signal light S22 and the second Raman pump light P22, which have been input, are combined in the optical combining and branching filter 12, and injected into the other input/output terminal of the optical-fiber transmission-line 1. The second wavelength multiplexed signal light S22 and the multiplexed signal light of the second Raman pump light P22, which have been input into the other input/output terminal of the optical-fiber transmission-line 1, are transmitted on the optical-fiber transmission-line 1 along the second transmission direction D2 toward one input/output terminal.

At this time, as the effect of the Raman amplification by the second Raman pump light P22 does not contribute to the second wavelength multiplexed signal light S22, the optical power of the second Raman pump light P22 is not reduced excluding the losses on the optical-fiber transmission-line 1, and the second Raman pump light P22 is transmitted with the second wavelength multiplexed signal light S22 along the second transmission direction D2 toward the other input/output terminal of the optical-fiber transmission-line 1.

Accordingly, the second wavelength multiplexed signal light S22 transmitted in the second transmission direction D2 is amplified to a desired light level after undergoing enough Raman amplification by the first Raman pump light P11 transmitted in the first transmission direction D1, as the second wavelength multiplexed signal light S22 approaches one input/output terminal of the optical-fiber transmission-line 1, and input to one input/output terminal of the optical combining and branching filter 11. Such a Raman-amplified second wavelength multiplexed signal light S22 is input to the optical amplifier 25 from the optical combining and branching filter 11 through the optical separator 13, optically amplified to a desired receiving level, and demultiplexed into signal lights with each wavelength in the wavelength demultiplexing device (DE-MUX) 26 for processing reception of each signal light in the plurality of receivers Rx21 to Rx2n which are provided in the optical receiving device 27. The signal lights output from the optical combining and branching filter 11 to the optical isolator 14 are blocked in the optical isolator 14, and is not input to the Raman pump light source 15.

Thus, according to the second embodiment, desired receiving characteristics can be obtained for bi-directional transmission, and the single-wire and bi-directional transmission using the Raman amplification can be performed, as the first wavelength multiplexed signal light S11 transmitted in the first transmission direction D1 and the second wavelength multiplexed signal light S22 transmitted in the second transmission direction D2 have different wavelength bands from each other, and, furthermore, the wavelength of the pump light is selected so that only the first signal light or only the second signal light is Raman-amplified. Therefore, a nonrepeartered transmission system capable of making the transmission distance longer can be established.

Figure 3:
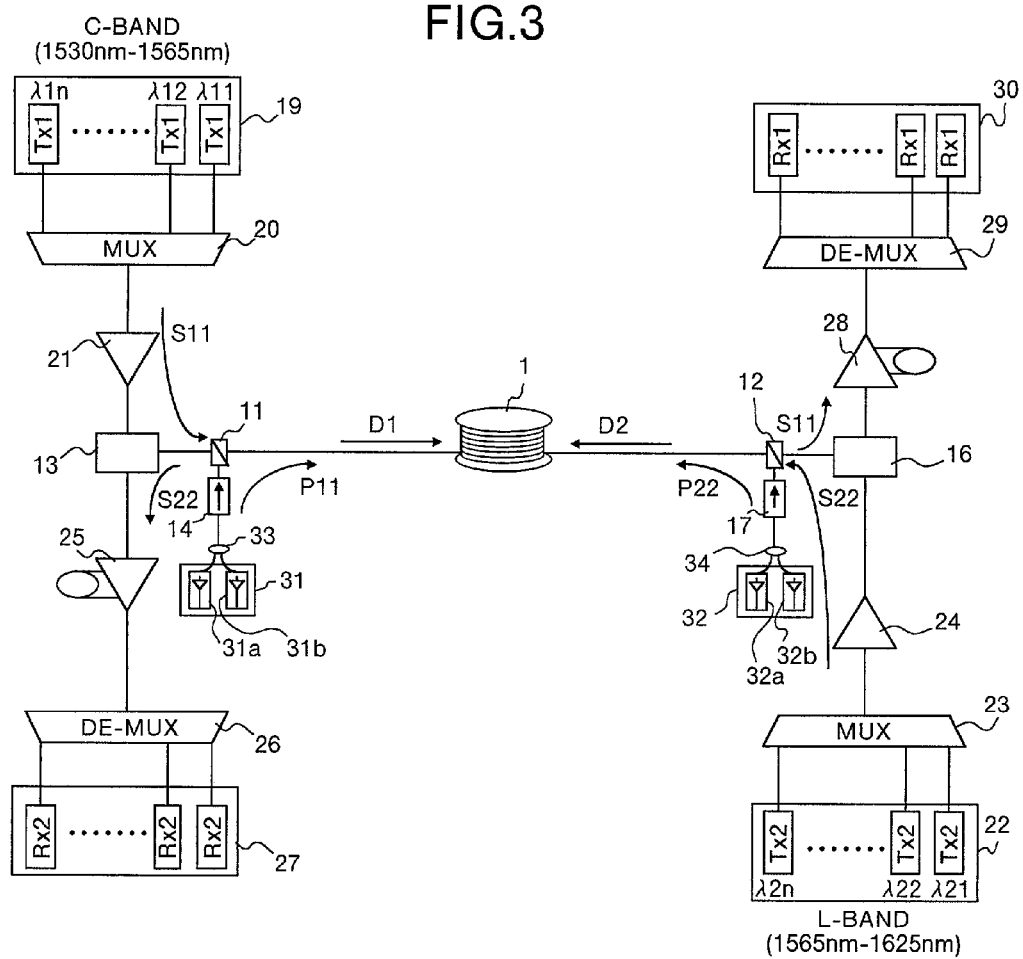
FIG. 3 shows a configuration of a single-wire bi-directional transmission device according to a third embodiment of this invention.

A third embodiment of this invention will be explained below. FIG. 3 is a view of a configuration of a single-wire bi-directional transmission device according to the third embodiment of this invention. The third embodiment shows a configuration example where the Raman pump light with a plurality of wavelengths is used in the second embodiment (see FIG. 2).

That is, in FIG. 3, Raman pump light source sections 31, 32 for generating Raman pump lights with two wavelengths are provided in the configuration shown in FIG. 2, instead of the Raman pump light sources 15, 18 for generating a Raman pump light with a single wavelength, and in addition, polarization combiners 33, 34 are provided between the Raman pump light source sections 31, 32, and the optical isolators 14, 17, respectively. Other parts except the parts are the same as those shown in FIG. 2. Hereinafter, parts featuring the third embodiment will be mainly explained.

Two Raman pump light sources 31a, 31b provided in the Raman pump light source section 31 generate Raman pump lights with mutually different wavelengths. The Raman pump lights generated in the two Raman pump light sources 31a, 31b are pump lights corresponding to the first Raman pump light P11 according to the second embodiment, and having predetermined wavelengths with the Raman gain-bandwidth including the wavelength of the second wavelength multiplexed signal light S22 and with the Raman gain-bandwidth excluding the wavelength of the first wavelength multiplexed signal light S11. The polarization combiner 33 is configured to orthogonally polarize and combine two lights output from the Raman pump light source section 31 to be input to the optical combining and branching filter 11 through the optical isolator 14.

Two Raman pump light sources 32a, 32b provided in the Raman pump light source section 32 generate Raman pump lights with mutually different wavelengths. The Raman pump lights generated in the two Raman pump light sources 32a, 32b are pump lights corresponding to the second Raman pump light P22 according to the second embodiment, and having predetermined wavelengths with the Raman gain-bandwidth including the wavelength of the first wavelength multiplexed signal light S11 and with the Raman gain-bandwidth excluding the wavelength of the second wavelength multiplexed signal light S22. The polarization combiner 34 is configured to orthogonally polarize and combine two output lights from the Raman pump light source section 32 to be input to the optical combining and branching filter 12 through the optical isolator 17.

As the Raman pump lights with a plurality of wavelengths are used as the first Raman pump light and the second Raman pump light in this third embodiment, a broader Raman gain-bandwidth than that of a case where a Raman pump light with a single wavelength is used can be obtained, and the number of multiplexed wavelengths can be increased. Accordingly, a large-capacity single-wire bi-directional transmission device can be realized, and a large-capacity, long-distance, and nonrepeartered transmission system can be established.

Figure 4:
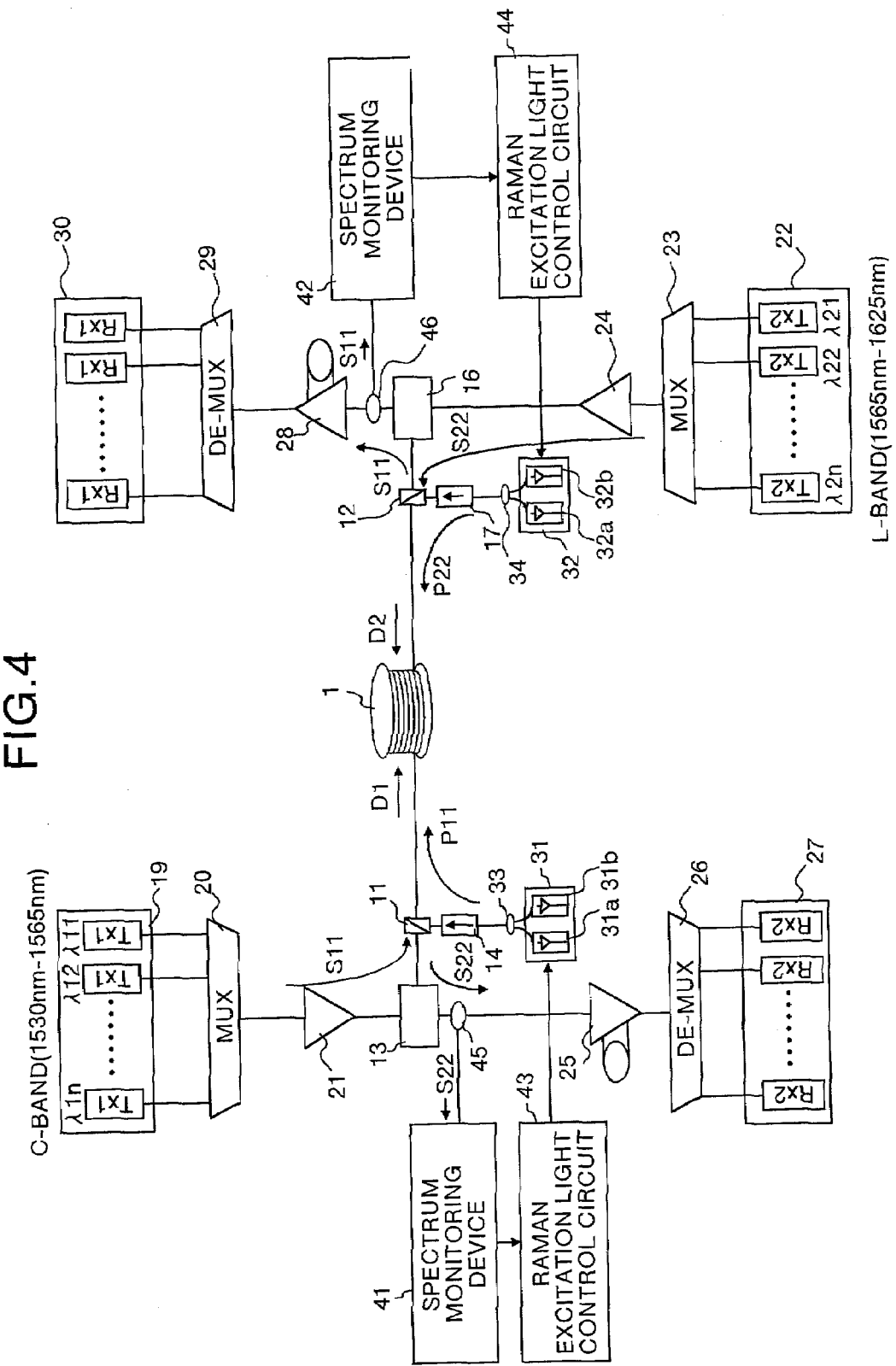
FIG. 4 shows a configuration of a single-wire bi-directional transmission device according to a fourth embodiment of this invention.

A fourth embodiment of this invention will be explained below. FIG. 4 shows a configuration of a single-wire bidirectional transmission device according to the fourth embodiment of the present invention. The fourth embodiment explains an example of configuration in which the wavelength spectrums of the two wavelength multiplexed signal lights are monitored and the Raman pump lights are controlled based on the monitored results in the third embodiment (see FIG. 3).

That is, in FIG. 4, spectrum monitoring devices 41, 42 and Raman pump light control circuits 43, 44 are added to the configuration shown in FIG. 3, and in addition optical branching devices 45, 46 are provided between optical separators 13, 16, and optical amplifiers 25, 28, respectively. Parts other than these parts are the same as those shown in FIG. 3. Hereinafter, parts featuring the fourth embodiment will be mainly explained.

As shown in FIG. 4, the optical branching device 45 branches the second wavelength multiplexed signal light S22 output from the optical separator 13 into two signal lights, outputs one of them to the optical amplifier 25, and outputs the other one to the spectrum monitoring device 41. The spectrum monitoring device 41 monitors the wavelength spectrum of the input second wavelength multiplexed signal light S22, and outputs the monitored results to the Raman pump light control circuit 43. The Raman pump light control circuit 43 controls the Raman pump light source 31 based on the monitored results for increasing or decreasing the power of the first Raman pump light P11 which is generated.

The optical branching device 46 branches the first wavelength multiplexed signal light S11 output from the optical separator 16 into two signal lights, outputs one of them to the optical amplifier 28, and outputs the other one to the spectrum monitoring device 42. The spectrum monitoring device 42 monitors the wavelength spectrum of the input first wavelength multiplexed signal light S11, and outputs the monitored results to the Raman pump light control circuit 44. The Raman pump light control circuit 44 controls the Raman pump light source section 32 based on the monitored results for increasing or decreasing the power of the second Raman pump light P22 which is generated.

Operations of the single-wire bi-directional transmission device will be explained below. In FIG. 4, the first wavelength multiplexed signal light S11 transmitted in the first transmission direction D1 is optically amplified by the Raman amplification effect of the second Raman pump light P22, and input to the optical branching device 46 through the optical combining and branching filter 12 and the optical separator 16. A part of the first wavelength multiplexed signal light S11 input to the optical branching device 46 is input to the spectrum monitoring device 42, and the remaining one is input to the optical amplifier 28.

The spectrum monitoring device 42 monitors the wavelength spectrum of the input first wavelength multiplexed signal light S11, and outputs the monitored signal to the Raman pump light control circuit 44. The Raman pump light control circuit 44 compares the differences between a preset reference signal and the input monitored signal, and detects deterioration in the power level of the first wavelength multiplexed signal light S11 as an error signal. Subsequently, the Raman pump light control circuit 44 controls the Raman pump light source 32, based on the detected error signal, so that the first wavelength multiplexed signal light S11 is always received at the desire power level, and adjusts the power of the second Raman pump light P22.

The second wavelength multiplexed signal light S22 transmitted in the second transmission direction D2 is optically amplified by the Raman amplification effect of the first Raman pump light P11, and input to the optical branching device 45 through the optical combining and branching filter 11 and the optical separator 13. A part of the second wavelength multiplexed signal light S22 input to the optical branching device 45 is input to the spectrum monitoring device 41, and the remaining one is input to the optical amplifier 21.

The spectrum monitoring device 41 monitors the wavelength spectrum of the input second wavelength multiplexed signal light S22, and outputs the monitored signal to the Raman pump light control circuit 43. The Raman pump light control circuit 43 compares the differences between a preset reference signal and the input monitored signal, and detects deterioration in the power level of the second wavelength multiplexed signal light S22 as an error signal. Subsequently, the Raman pump light control circuit 43 controls the Raman pump light source 31, based on the detected error signal, so that the second wavelength multiplexed signal light S22 is always received at the desire power level, and adjusts the power of the first Raman pump light P11.

According to the fourth embodiment, the single-wire bi-directional transmission device having stable transmission characteristics can be realized, as the wavelength spectrums of the first wavelength multiplexed signal light S11 and the second wavelength multiplexed signal light S22 are monitored, and the levels of the corresponding pump lights are adjusted so that the wavelength multiplexed signal lights are always obtained at the desired receiving level. Moreover, it is obvious that this invention can be also applied to the first and second embodiments, though the fourth embodiment has shown the application of this invention to the third embodiment.

Figure 5:
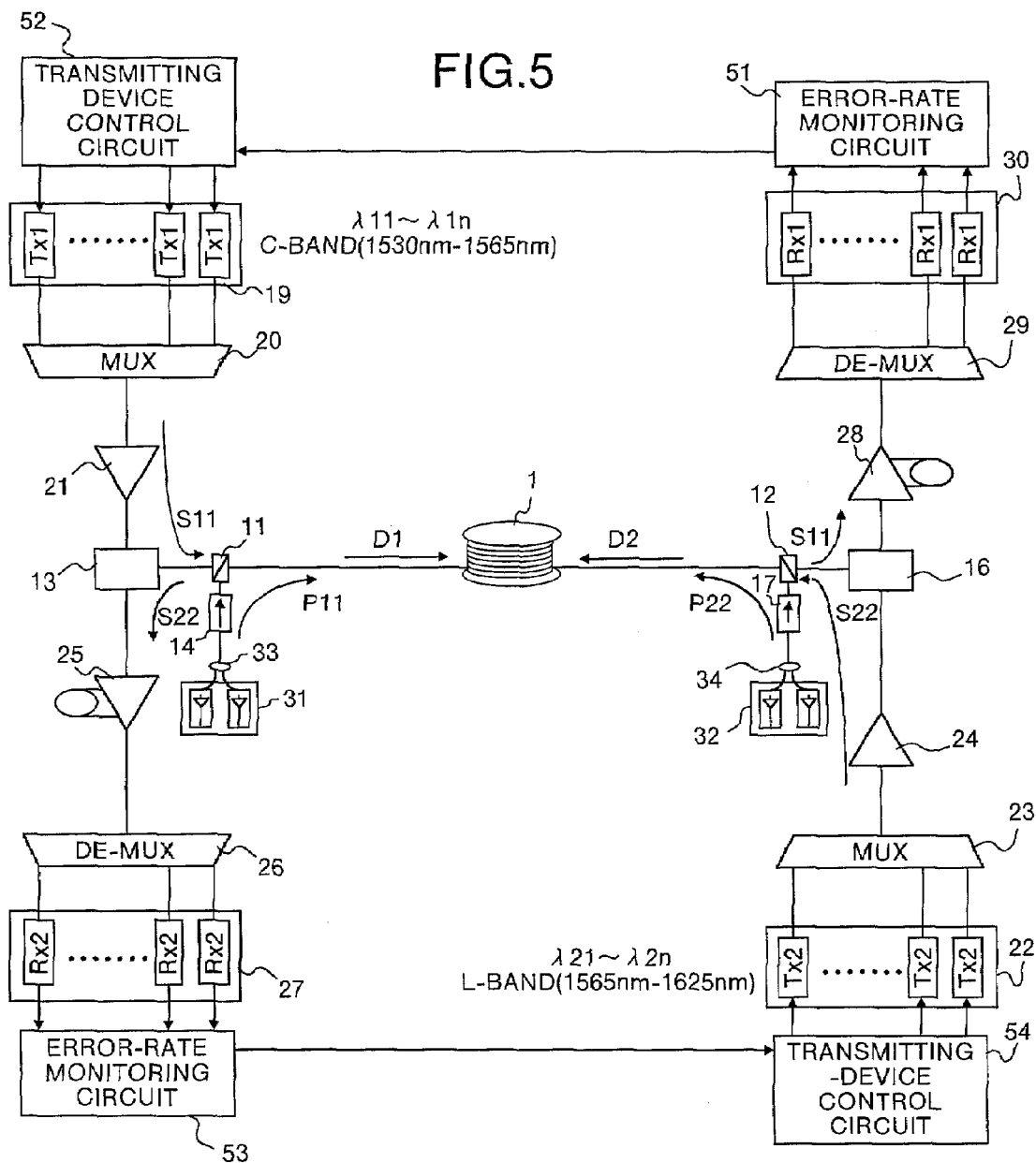
FIG. 5 shows a configuration of a single-wire bi-directional transmission device according to a fifth embodiment of this invention.

A fifth embodiment of this invention will be explained below. FIG. 5 is a view of a configuration of a single-wire bi-directional transmission device according to the fifth embodiment of the present invention. The fifth embodiment shows a configuration example where the transmission characteristics are monitored and the transmitting power is controlled based on the monitored results in the third embodiment (see FIG. 3).

That is, in FIG. 5, error-rate monitoring circuits 51, 53 and transmitting-device control circuits 52, 54 are added to the configuration shown in FIG. 3. Other parts except the parts are the same as those shown in FIG. 3. Hereinafter, parts featuring the fifth embodiment will be mainly explained.

In FIG. 5, the error-rate monitoring circuit 51 measures the error rate of received signals output respectively from the optical receivers Rx11 to Rx1n provided in the optical receiving device 30, and monitors the transmission characteristics of each wavelength at the first wavelength multiplexed signal light S11. The transmitting-device control circuit 52 receives the monitored results of the transmission characteristics from the error-rate monitoring circuit 51, and separately controls so as to increase or decrease each transmitting level of the optical transmitters Tx11 to Tx1n which are provided in the optical transmitting device 19.

The error-rate monitoring circuit 53 measures the error rate of received signals output respectively from the optical receivers Rx21 to Rx2n provided in the optical receiving device 27, and monitors the transmission characteristics of each wavelength at the second wavelength multiplexed signal light S22. The transmitting-device control circuit 54 receives the monitored results of the transmission characteristics from the error-rate monitoring circuit 53, and separately controls so as to increase or decrease each transmitting level of the optical transmitters Tx21 to Tx2n provided in the optical transmitting device 22.

Operations of the single-wire bi-directional transmission device will be explained below. In FIG. 5, the first wavelength multiplexed signal light S11 transmitted in the first transmission direction D1 is optically amplified by the Raman amplification effect of the second Raman pump light P22, and input to the optical amplifier 28 through the optical combining and branching filter 12 and the optical separator 16. The first wavelength multiplexed signal light S11, which has been optically amplified to a desired receiving level in the optical amplifier 28, is branched into signal lights with each wavelength in the wavelength demultiplexing device (DE-MUX) 29, and the branched signal lights are input to the corresponding optical receivers Rx11 to Rx1n, respectively, which are provided in the optical receiving device 30 to undergo receiving processing.

The error-rate monitoring circuit 51 measures the error rates of each received signal, which has undergone the receiving processing in the optical receivers Rx11 to Rx1n, which are provided in the optical receiving device 30 as described above, and inputs the error-rate monitoring signal of each received signal to the transmitting-device control circuit 52. The transmitting-device control circuit 52 controls so as to increase or decrease the signal power level of each transmitting signal light of the optical transmitters Tx11 to Tx1n, which are provided in the optical transmitting device 19, so that the error rates of wavelengths at the error-rate monitoring circuit 51 become desired ones.

The second wavelength multiplexed signal light S22 transmitted in the second transmission direction D2 is optically amplified by the Raman amplification effect of the first Raman pump light P11, and input to the optical amplifier 25 through the optical combining and branching filter 11 and the optical separator 13. The second wavelength multiplexed signal light S11, which has been optically amplified to a desired receiving level in the optical amplifier 25, is branched into signal lights with each wavelength in the wavelength demultiplexing device (DE-MUX) 26, and the branched signal lights are input to the corresponding optical receivers Rx21 to Rx2n, respectively, which are provided in the optical receiving device 27, and undergo receiving processing.

The error-rate monitoring circuit 53 measures the error rate of each received signal, which has undergone the receiving processing in the optical receivers Rx21 to Rx2n which are provided in the optical receiving device 27 as described above, and inputs the error-rate monitoring signal of each received signal to the transmitting-device control circuit 54. The transmitting-device control circuit 54 controls so as to increase or decrease the signal power level of each transmitting signal light of the optical transmitters Tx21 to Tx2n, which are provided in the optical transmitting device 22, so that the error rates of wavelengths at the error-rate monitoring circuit 53 become desired ones.

According to the fifth embodiment, stable transmission characteristics can be always obtained, as the error-rate characteristics of each wavelength of the first wavelength multiplexed signal light S11 and the second wavelength multiplexed signal light S22 are monitored, and the signal-power levels of the transmitting signal lights for each wavelength can be adjusted so that the desired error-rates are obtained. Moreover, it is obvious that this invention can be also applied to the first and second embodiments, though the fifth embodiment has shown the application of this invention to the third embodiment.

Figure 6:
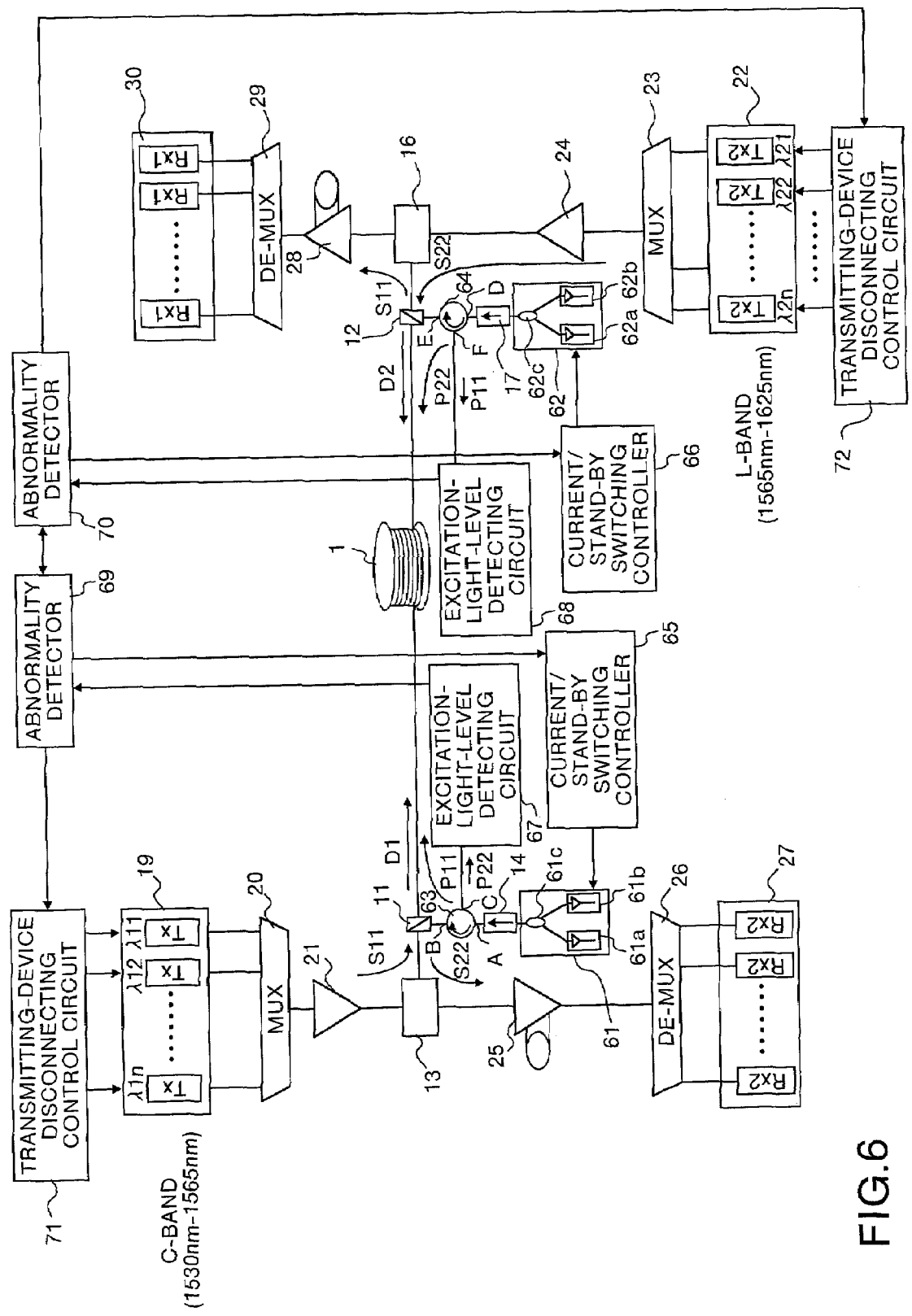
FIG. 6 shows a configuration of a single-wire bi-directional transmission device according to a sixth embodiment of this invention.
Figure 7:
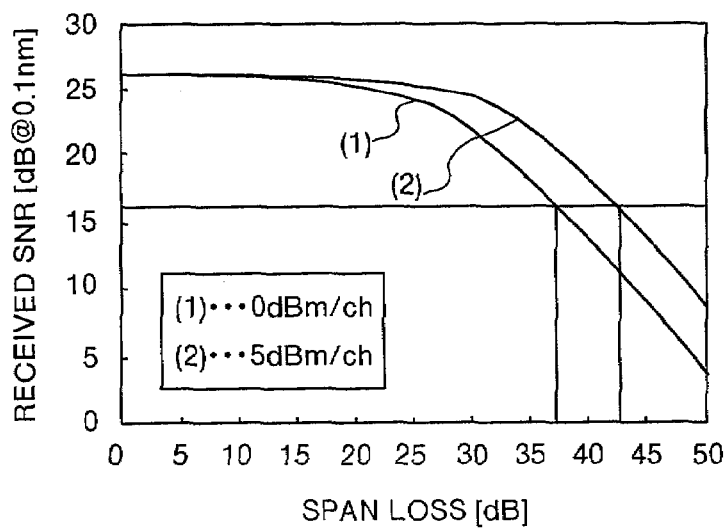
FIG. 7 shows a relation between the transmission loss and the received-signal to noise ratio in the optical-fiber nonrepeartered transmission.
Figure 8:
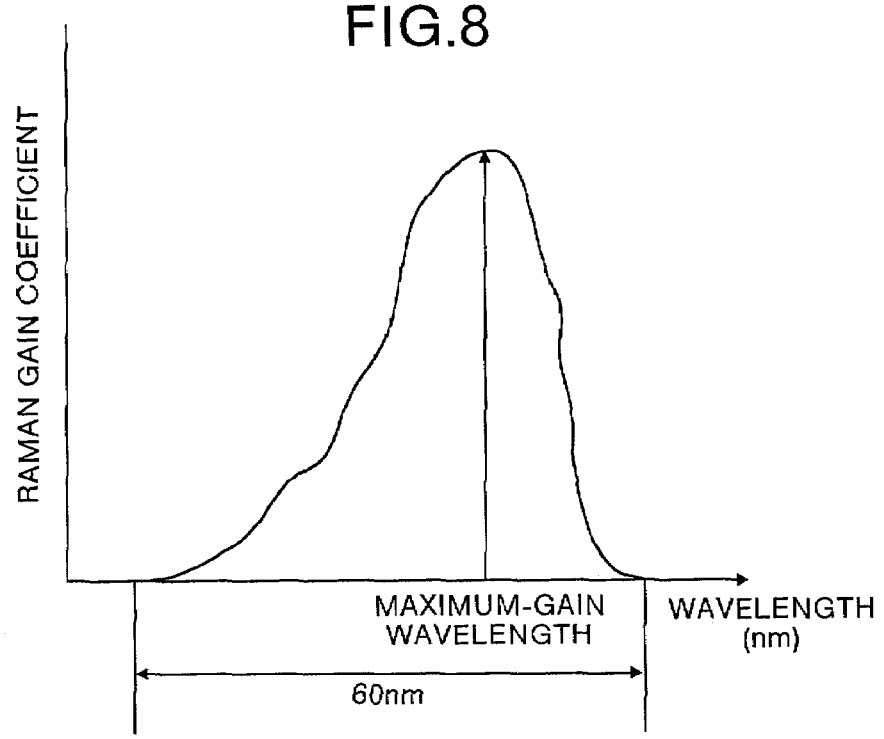
FIG. 8 is a view for explaining Raman gain-bandwidth generated by a Raman pump light.
Figure 9A:
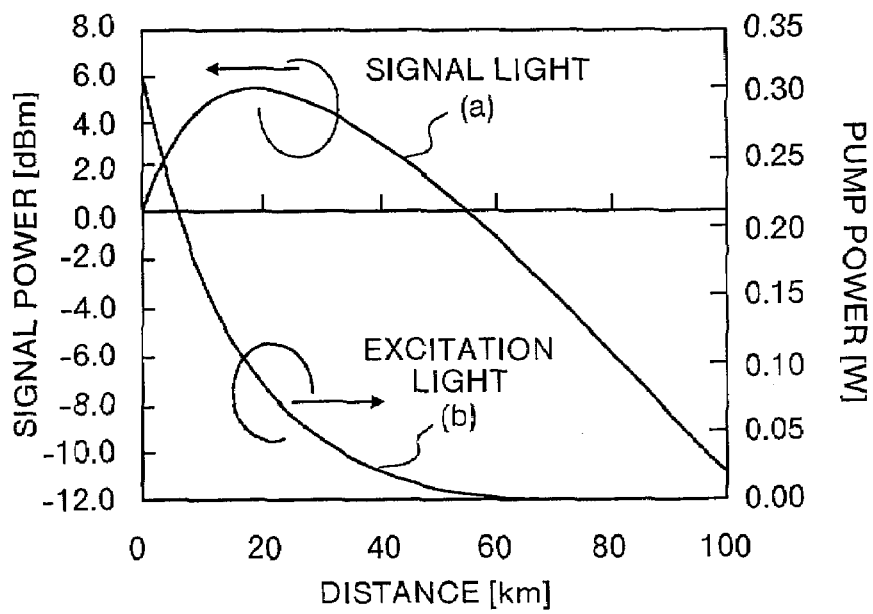
FIG. 9A and FIG. 9B are views for explaining Raman amplification.
Figure 9B:
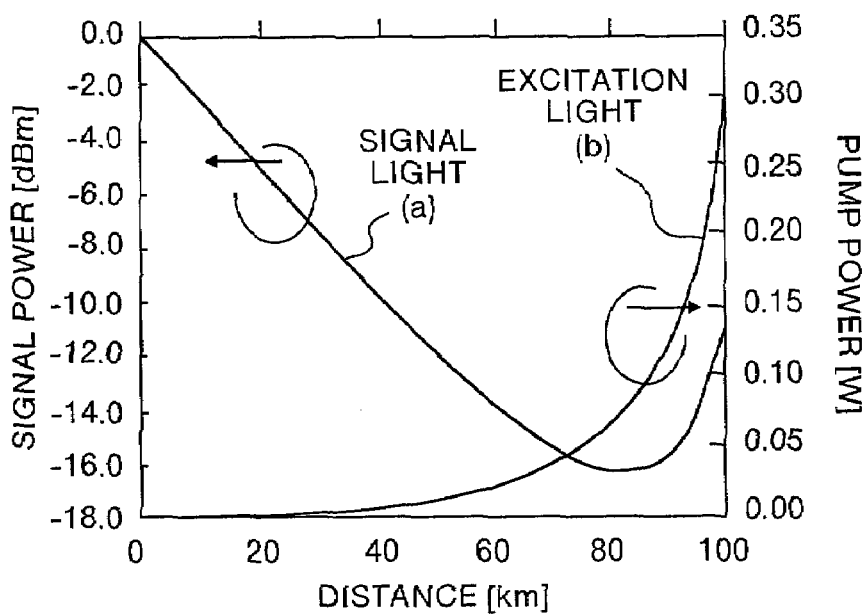
Figure 10:
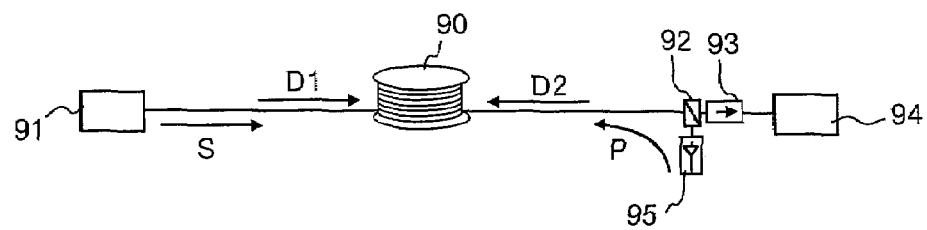
FIG. 10 shows an example of a configuration of the uni-directional and nonrepeartered transmission system where Raman amplification by backward pump is applied.
Figure 11:
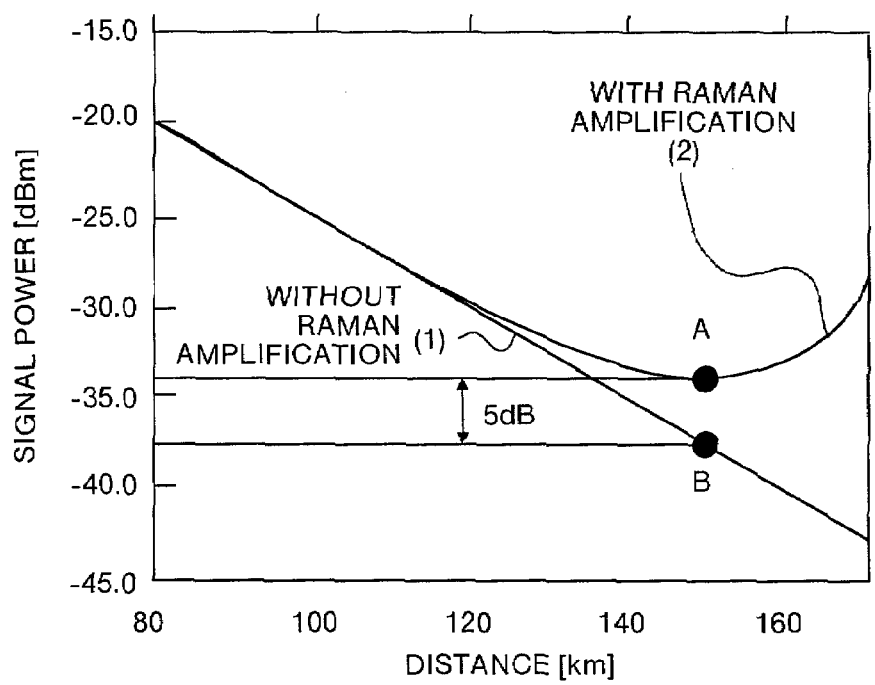
FIG. 11 is a view for explaining Raman amplification effect in the system shown in FIG. 10.
Figure 12:
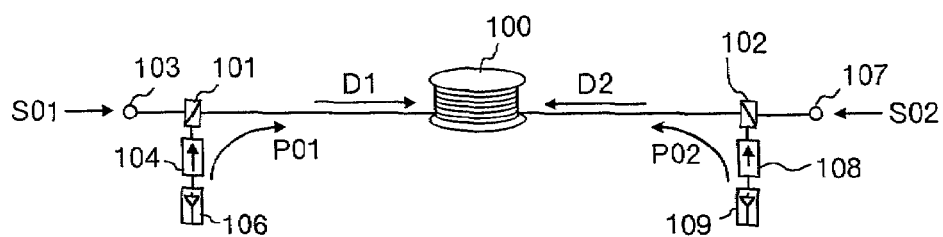
FIG. 12 shows an example of a configuration where single-wire and bi-directional transmission is realized by application of the Raman amplification based on backward pump.

A sixth embodiment of this invention will be explained below. FIG. 6 is a view of a configuration of a single-wire bi-directional transmission device according to the sixth embodiment of this invention. The sixth embodiment shows a configuration example where disconnection of the transmission line is detected using the Raman pump light based on the second embodiment (see FIG. 2).

That is, in FIG. 6, Raman pump light source sections 61, 62 are provided, instead of the Raman pump light sources 15, 18, in the configuration shown in FIG. 2, and optical circulators 63, 64 are provided between the optical combining and branching filters 11, 12 and the optical isolators 14, 17, respectively. In addition, current/stand-by switching controllers 65, 66, pump-light-level detecting circuits 67, 68, abnormality detectors 69, 70, and transmitting-device disconnecting control circuits 71, 72 are provided. Other parts except the parts are the same as those shown in FIG. 2. Hereinafter, parts featuring the sixth embodiment will be mainly explained.

The Raman pump light source section 61 comprises two Raman pump light sources 61a, 61b for generating the first Raman pump lights P11 with the same wavelength, and an optical switch 61c for selecting an output light of one of the two Raman pump light source 61a, 61b according to a switching signal from the current/stand-by switching controller 65, and for outputting the selected light to the optical isolator 14. Here, the Raman pump light source 61a is configured to be for the current system, and the Raman pump light source 61b is for the stand-by system.

The Raman pump light source section 62 comprises two Raman pump light sources 62a, 62b for generating the second Raman pump lights P22 with the same wavelength, and an optical switch 62c for selecting an output light of the other one of the two Raman pump light source 62a, 62b according to a switching signal from the current/stand-by switching controller 66, and for outputting the selected light to the optical isolator 17. Here, the Raman pump light source 62a is configured to be for the current system, and the Raman pump light source 62b is for the stand-by system.

The optical circulator 63 comprises three ports which are a port A, a port B, and a port C. The port A is connected to the output terminal of the optical isolator 14. The port B is connected to the optical combining and branching filter 11. The Port C is connected to the pump-light-level detecting circuit 67. The optical circulator 63 has a configuration where signal lights do not pass through on routes from the port A to the port C, and from the port B to the port A, though signal lights pass through on routes from the port A to the port B, and from the port B to the port C. Similarly, the optical circulator 64 comprises three ports which are a port D, a port E, and a port F. The port D is connected to the output terminal of the optical isolator 17. The port E is connected to the optical combining and branching filter 12. The Port F is connected to the pump-light-level detecting circuit 68. The optical circulator 64 has a configuration where signal lights do not pass through routes from the port D to the port F and from the port E to the port D, though signal lights pass through routes from the port D to the port E and from the port E to the port F.

The pump-light-level detecting circuit 67 outputs transmission-line information, which is based on the level of the signal lights (the second Raman pump light P22) input from the optical circulator 63, to the abnormality detector 69. The pump-light-level detecting circuit 68 outputs the presence or absence of abnormality to the abnormality detector 70, based on transmission-line information according to the level of the signal lights input from the optical circulator 64. The abnormality detector 69 and the abnormality detector 70 determine the presence or absence of the abnormality by exchanging the transmission-line information from the pump-light-level detecting circuits 67, 68 between both of the abnormality detectors. When detecting occurrence of abnormality, the abnormality detector 69 outputs a signal indicating detection of the abnormality to the transmitting-device disconnecting control circuit 71 according to the contents, and also outputs a switching signal to the current/stand-by switching controller 65. When detecting occurrence of abnormality, the abnormality detector 70 outputs a signal indicating detection of the abnormality to the transmitting-device disconnecting control circuit 72 according to the contents, and also outputs a switching signal to the current/stand-by switching controller 66.

When the abnormality detection signal is input from the abnormality detector 69, the transmitting-device disconnecting control circuit 71 controls so that the optical transmitters Tx11 to Tx1n provided in the optical transmitting device 19 are turned off. When the switching signal is input from the abnormality detector 69, the current/stand-by switching controller 65 controls the optical switch 61c of the Raman pump light source section 61 to switch between the light sources, which generate the Raman pump lights.

When the abnormality detection signal is input from the abnormality detector 70, the transmitting-device disconnecting control circuit 72 controls so that the optical transmitters Tx21 to Tx2n provided in the optical transmitting device 22 are turned off. When the switching signal is input from the abnormality detector 70, the current/stand-by switching controller 66 controls the optical switch 62c of the Raman pump light source section 62 to switch between the light sources, which generate the Raman pump lights.

Operations of the single-wire bi-directional transmission device will be explained below. In FIG. 6, the first Raman pump light P11 and the first wavelength multiplexed signal light S11, which are combined in the optical combining and branching filter 11, are transmitted on the optical-fiber transmission-line 1 in the first transmission direction D1. And, the second Raman pump light P22 and the second wavelength multiplexed signal light S22, which are combined in the optical combining and branching filter 12, are transmitted on the optical-fiber transmission-line 1 in the second transmission direction D2.

At this time, the first wavelength multiplexed signal light S11 is optically amplified by the Raman effect of the second Raman pump light P22, and the second wavelength multiplexed signal light S22 is done so by the Raman effect of the first Raman pump light P11. At the same time, the first Raman pump light P11 is transmitted on the optical-fiber transmission-line 1 in the first transmission direction D1, contributing to Raman amplification of the second wavelength multiplexed signal light S22, and the second Raman pump light P22 is transmitted on the optical-fiber transmission-line 1 in the second transmission direction D2, contributing to Raman amplification of the first wavelength multiplexed signal light S11. Accordingly, the Raman-amplified first wavelength multiplexed signal light S11 and the first Raman pump light P11 are input to the optical combining and branching filter 12, and the Raman-amplified second wavelength multiplexed signal light S22 and the second Raman pump light P22 are input to the optical combining and branching filter 11.

The optical combining and branching filter 12 leads the first wavelength multiplexed signal light S11 to the optical separator 16, and leads the first Raman pump light P11 to the port E of the optical circulator 64. The first wavelength multiplexed signal light S11 led to the optical separator 16 is amplified to a desired light level in the optical amplifier 28, and is branched into signal lights with each wavelength in the wavelength demultiplexing device (DE-MUX) 29, and the signal lights with each wavelength are input to the optical receiving device 30, where they undergo receiving processing.

On the other hand, the first Raman pump light P11 led to the port E of the optical circulator 64 is outputted from the port F to the pump-light-level detecting circuit 68. The pump-light-level detecting circuit 68 compares a light level of the entered first Raman pump light P11 with a reference level which has been previously set, and transmits the results of comparison to the abnormality detector 70 as transmission-line information.

The optical combining and branching filter 11 leads the second wavelength multiplexed signal light S22 to the optical separator 13, and leads the second Raman pump light P22 to the port B of the optical circulator 63. The second wavelength multiplexed signal light S22 led to the optical separator 13 is amplified to a desired light level in the optical amplifier 25, is branched into signal lights with each wavelength in the wavelength demultiplexing device (DE-MUX) 26, and the signal lights with each wavelength are input to the optical receiving device 27, where they undergo receiving processing.

On the other hand, the second Raman pump light P22 led to the port B of the optical circulator 63 is outputted from the port C to the pump-light-level detecting circuit 67. The pump-light-level detecting circuit 67 compares a light level of the entered second Raman pump light P22 with a reference level which has been previously set, and transmits the results of comparison to the abnormality detector 69 as transmission-line information.

Pieces of the transmission-line information input from the corresponding pump-light-level detecting circuits 67, 68 are always exchanged between the abnormality detector 69 and the abnormality detector 70. And, when both of the abnormality detector 69 and the abnormality detector 70 detect abnormality on the transmission line, it is determined that disconnection has occurred on the optical-fiber transmission-line 1. In this case, the abnormality detector 69 sends the abnormality signal to the transmitting-device disconnecting control circuit 71, and the abnormality detector 70 sends the abnormality signal to the transmitting-device disconnecting control circuit 72. As a result, the transmitting-device disconnecting control circuit 71 controls so that the optical transmitters Tx11-Tx1n provided in the optical transmitting device 19 are turned off, and the transmitting-device disconnecting control circuit 72 controls so that the optical transmitters Tx21-Tx2n provided in the optical transmitting device 22 are turned off.

On the other hand, it is determined that there is an abnormality in the pump light level, when only one of the abnormality detector 69 and the abnormality detector 70 determines that there is an abnormality, as a result of exchange of the transmission-line information between the abnormality detector 69 and the abnormality detector 70. That is, when the abnormality detector 69 detects the abnormality and the abnormality detector 70 does not detect the abnormality, it is determined that there is an abnormality in the second Raman pump light P22, and a switching signal is sent from the abnormality detector 70 to the current/stand-by switching controller 66. Therefore, the current/stand-by switching controller 66 controls the optical switch 62c of the Raman pump light source section 62 so that switching is performed from the current Raman pump light source 62a to the stand-by Raman pump light source 62b.

Conversely, when the abnormality detector 70 detects any abnormality and the abnormality detector 69 does not detect any abnormality, it is determined that there is an abnormality in the first Raman pump light P11, and a switching signal is sent from the abnormality detector 69 to the current/stand-by switching controller 65. Therefore, the current/stand-by switching controller 65 controls the optical switch 61c of the Raman pump light source section 61 so that switching is performed from the current Raman pump light source 61a to the stand-by Raman pump light source 61b.

Thus, according to the sixth embodiment, it is possible to detect disconnection on the transmission line and to monitor abnormalities in the pump lights, since the first and the second Raman pump lights may be used as a monitoring signal. Moreover, this invention is also applicable to the first, third to fifth embodiments, although this invention has been applied to the second embodiment as one example in the sixth embodiment. Further, even the forward pump can be also applied, although the backward pump has been applied in terms of efficiency and so on in the first to sixth embodiments as described above. Accordingly, it is obvious that the transmission distance can be made longer.

This forward pump will be explained using the first embodiment as an example while referring to FIG. 1. The first Raman pump light P1 generated by the Raman pump light source 6 has predetermined wavelengths with a Raman gain-bandwidth for amplifying the wavelength of the first signal_light S1, and without a Raman gain-bandwidth for amplifying the wavelength of the second signal light S2. The second Raman pump light P2 generated by the Raman pump light source 9 has predetermined wavelengths with a Raman gain-bandwidth for amplifying the wavelength of the second signal light S2, and without a Raman gain-bandwidth for amplifying the wavelength of the first signal light S1.

The first signal light S1 input to the input/output terminal 4 and the first Raman pump light P1 generated by the Raman pump light source 6 are combined in the optical combining and branching filter 2, are injected into one input/output terminal of the optical-fiber transmission-line 1, and are transmitted on the optical-fiber transmission-line 1 along the first transmission direction D1 toward the other input/output terminal.

The second signal light S2 input to the input/output terminal 7 and the second Raman pump light P2 generated by the Raman pump light source 9 are combined in the optical combining and branching filter 3, are injected into the other input/output terminal of the optical-fiber transmission-line 1, and are transmitted on the optical-fiber transmission-line 1 along the second transmission direction D2 toward the one input/output terminal.

As the first Raman pump light P1 does not have the Raman gain-bandwidth such that the Raman amplification effect by the first Raman pump light P1 contributes to amplification of the second signal light S2 the optical power of the first Raman pump light P1 is not reduced by the second signal light S2 that is transmitted along the second transmission direction D2 and reaches the one input/output terminal. Accordingly, the first signal light S1 injected into the one input/output terminal of the optical-fiber transmission-line 1 is amplified to a desired light level after undergoing enough Raman amplification by the first Raman pump light P1 by the first Raman pump light P1.

Similarly, as the second Raman pump light P2 does not have the Raman gain-bandwidth such that the Raman amplification effect by the second Raman pump light P2 contributes to amplification of the first signal light S1, the optical power of the second Raman pump light P2 is not reduced by the first signal light S1 that is transmitted along the first transmission direction D1 and reaches the other input/output terminal. Accordingly, the second signal light S2 injected into the other input/output terminal of the optical-fiber transmission-line 1 is amplified to a desired light level after undergoing enough Raman amplification by the second Raman pump light P2.

According to one aspect of this invention, the first Raman pump light generated by the first Raman pump light source is injected from either of one input/output terminal or the other input/output terminal into the optical-fiber transmission-line by the first injection unit, and the second Raman pump light generated by the second Raman pump light source is injected from the other one of either one input/output terminal or the other input/output terminal into the optical-fiber transmission-line by the second injection unit, when the first signal light and the second signal light with different wavelengths from each other are bidirectionally transmitted on the optical-fiber transmission-line. That is, the first Raman pump light and the second Raman pump light are injected into the optical-fiber transmission-line by the forward pump scheme or the backward pump scheme. As the first Raman pump light is an pump light having predetermined wavelengths with a Raman gain-bandwidth for amplifying the first signal light, and without a Raman gain-bandwidth for amplifying the second signal light, the first signal light is transmitted toward the other input/output terminal, under optical amplification by the first Raman pump light. On the other hand, the second signal light is transmitted toward one input/output terminal, under optical amplification by the second Raman pump light, as the second Raman pump light is an pump light having predetermined wavelengths with a Raman gain-bandwidth for amplifying the second signal light, and without a Raman gain-bandwidth for amplifying the first signal light. Accordingly, the single-wire and bi-directional transmission in which the Raman amplification effect is applied can be realized, and the nonrepeartered transmission system capable of making the transmission distance longer can be established.

Moreover, the first wavelength multiplexed signal light and the second wavelength multiplexed signal light are transmitted under optical amplification by the Raman amplification effect, respectively. Accordingly, the wavelength multiplexed signal light can be transmitted in the single-wire and bi-directional transmission in which the Raman amplification effect is applied.

Furthermore, the Raman gain-bandwidth can be made broader, as the Raman pump lights with a plurality of different wavelengths are used as the first Raman pump light and the second Raman pump light. Accordingly, the capacity of the nonrepeartered transmission system can be made larger, as the number of multiplexed wavelengths can be increased.

Moreover, the Raman gain-bandwidth may be efficiently made broader, as a plurality of Raman pump lights with different wavelengths are used after polarization combining. Accordingly, the capacity of the nonrepeartered transmission system may be efficiently made larger.

Furthermore, the first Raman pump light source is controlled by the first Raman pump-light-level control unit so that the power level of the first Raman pump light is increased or decreased based on the power level of the first signal light. And, the second Raman pump light source is controlled by the second Raman pump-light-level control unit so that the power level of the second Raman pump light is increased or decreased based on the power level of the second signal light. Accordingly, wavelength multiplexed signals with a desired level can be always obtained, and stable transmission characteristics can be realized, as the stable and constant Raman amplification effect can be obtained.

Moreover, the power level of the first signal light injected into one input/output terminal of the optical-fiber transmission-line is controlled by the first signal light level control unit, based on the error rate of the first signal light. And, the power level of the second signal light injected into the other input/output terminal of the optical-fiber transmission-line is controlled by the second signal light level control unit, based on the error rate of the second signal light. Accordingly, the transmission characteristics of the wavelength multiplexed signal light are stably controlled in a desired state at any time.

Furthermore, the power levels of the first Raman pump light and the second Raman pump light which are transmitted on the optical-fiber transmission-line are monitored by the first Raman pump-light-level detecting unit and the second pump-light-level detecting unit, respectively. Then, the abnormality detection signal is generated, when both the detection signal of the first Raman pump-light-level detecting unit and that of the second Raman pump-light-level detecting unit simultaneously show abnormalities on the transmission-line in the transmission-line abnormality detecting unit. Thereby, the first signal-light stopping unit and the second signal-light stopping unit stop generating the first signal light and the second signal light, respectively. Accordingly, there is no necessity for installing an independent monitoring system, and the monitoring system of the nonrepeartered transmission system can be established at low cost, as the Raman pump lights are used as a monitoring signal to enable detection of disconnection on transmission lines and stop of generation of signal lights.

Moreover, the first Raman pump light source and the second Raman pump light source each comprise the light source for the current system, the light source for the stand-by system, and the optical switch for selecting one of the light source for the current system and the light source for the stand-by system. The power levels of the first Raman pump light and the second Raman pump light which are transmitted on the optical-fiber transmission-line are monitored by the first Raman pump-light-level detecting unit and the second Raman pump-light-level detecting unit, respectively. When reduction in the level of one of the first Raman pump light and the second Raman pump light is detected by the pump-light-level abnormality detecting unit based on the detection signals of the first Raman pump-light-level detecting unit and the second Raman pump-light-level detecting unit, the current/stand-by switching unit is started, and switching from the light source for the current system to the light source for the stand-by system after selection is performed by the optical switch corresponding to either one of the first Raman pump light source and the second Raman pump light source. Accordingly, the nonrepeartered transmission system with high reliability can be established, as the Raman pump lights are used as a monitoring signal to enable detection of abnormalities in the pump lights and switching between the current system and the stand-by system.

Furthermore, the first Raman pump light source and the second Raman pump light source each comprise the light source for the current system, the light source for the stand-by system, and the optical switch for selecting one of the light source for the current system and the light source for the stand-by system. When reduction in the level of one of the first Raman pump light and the second Raman pump light is detected by the pump-light-level abnormality detecting unit, based on the detection signals of the first Raman pump-light-level detecting unit and the second Raman pump-light-level detecting unit, the current/stand-by switching unit is started, and switching from the light source for the current system to the light source for the stand-by system is performed by the optical switch corresponding to either one of the first Raman pump light source and the second Raman pump light source. Accordingly, the nonrepeartered transmission system with high reliability can be established, as the Raman pump lights are used as a monitoring signal to enable detection of disconnection on the transmission-line, and, in addition, detection of abnormalities in the pump lights.

According to another aspect of this invention, on an optical-fiber transmission-line, a first signal light is transmitted from one input/output terminal toward the other input/output terminal, and a second signal light with a different wavelength from that of the first signal light is transmitted from the other input/output terminal toward the one input/output terminal. A first Raman pump light having predetermined wavelengths with a Raman gain-bandwidth for amplifying the first signal light and without a Raman gain-bandwidth for amplifying the second signal light, and a second Raman pump light having predetermined wavelengths with a Raman gain-bandwidth for amplifying the second signal light and without a Raman gain-bandwidth for amplifying the first signal light, are respectively injected from different input/output terminals into said optical-fiber transmission-line. Therefore, the first signal light is transmitted toward the other input/output terminal under optical amplification by the first Raman pump light, while the second signal light is transmitted toward one input/output terminal under optical amplification by the second Raman pump light. Accordingly, the single-wire bi-directional transmission method in which the Raman amplification effect is applied can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A single-wire bi-directional transmission device, comprising:
   an optical-fiber transmission-line on which a first signal light is transmitted in a first transmission direction from one input/output terminal toward the other input/output terminal, and a second signal light with a different wavelength from that of the first signal light is transmitted in a second transmission direction opposite to the first transmission direction;
   a first Raman pump light source which generates a first Raman pump light having predetermined wavelengths with a Raman gain-bandwidth for amplifying the first signal light, but not having a Raman gain-bandwidth for amplifying the second signal light;
   a first injection unit which injects the first Raman pump light from either of said one input/output terminal, or said other input/output terminal into said optical-fiber transmission-line;
   a second Raman pump light source which generates a second Raman pump light having predetermined wavelengths with a Raman gain-bandwidth for amplifying the second signal light, but not having a Raman gain-bandwidth for amplifying the first signal light;
   a second injection unit which injects the second Raman pump light from the other one of either of said one input/output terminal, or said other input/output terminal into said optical-fiber transmission-line;
   a first optical transmitting unit that includes a plurality of transmitters which generate first signal lights with different wavelengths, respectively, in a first wavelength band;
   a second optical transmitting unit that includes a plurality of transmitters which generate second signal lights with differents wavelengths, respectively, in a second wavelength band having a different frequency band from that of the first wavelength band;
   a first optical receiving unit that includes a plurality of receivers which receives the first signal lights;
   a second optical receiving unit that includes a plurality of receivers which receives the second signal lights;
   a first error-rate monitoring unit that measures an error rate of received signals output respectively from the plurality of receivers in the first optical receiving unit;
   a second error-rate monitoring unit that measures an error rate of received signals output respectively from the plurality of receivers in the second optical receiving unit;
   a first transmitting unit control unit which controls the first optical transmitting unit so that the transmitting level of the first optical transmitting unit is increased or decreased based on monitored results from the first error-rate monitoring unit; and
   a second transmitting-unit control unit which controls the second optical transmitting unit so that the level of the second is increased or decreased based on monitored results from the first error-rate monitoring unit.

2. The single-wire bi-directional transmission device according to claim 1, wherein said first signal light and second signal light are wavelength multiplexed signal lights each comprising a plurality of signal lights having different wavelength from each other.

3. The single-wire hi-directional transmission device according to claim 2, wherein said first Raman pump light source and second Raman pump light source generate a plurality of Raman pump lights with different wavelengths as the first Raman pump light, and second Raman pump light, respectively.

4. The single-wire hi-directional transmission device according to claim 3, further comprising:
   a first polarization combining unit and a second polarization combining unit which respectively polarize and combine a plurality of Raman pump lights with different wavelengths forming the first Raman pump light and the second Raman pump light, and which give the results to the corresponding input/output terminals of said first injecting unit and said second injecting unit.

5. A single-wire bi-directional transmission method, comprising:
   transmitting, on an optical-fiber transmission-line, a first signal light from one input/output terminal toward the other input/output terminal, and transmitting a second signal light with a different wavelength from that of the first signal light from said other input/output terminal toward said one input/output terminal,
   respectively injecting a first Raman pump light having predetermined wavelengths with a Raman gain-bandwidth for amplifying the first signal light, but not having a Raman gain-bandwidth for amplifying the second signal light, and a second Raman pump light having predetermined wavelengths with a Raman gain-bandwidth for amplifying the second signal light, but not having a Raman gain-bandwidth for amplifying the first signal light, from different input/output terminals into said optical-fiber transmission-line; and
   generating first signal lights with different wavelengths in a first wavelength band, respectively at a plurality of transmitters in a first optical transmitting unit;
   generating second signal lights with different wavelengths, respectively, in a second wavelength band having a different frequency band from that of the first wavelength band, respectively at a plurality of transmitters in a second optical transmitting unit;
   receiving the first signal lights in the first wavelength band;
   receiving the second signal lights in the second wavelength band;
   measuring, at a first error-rate monitoring unit, a first error rate of received signals output respectively from a plurality of receivers in a first optical receiving unit;
   wherein a transmitting level of the first optical transmitting unit is controlled such that the transmitting level is increased or decreased based on monitored results from the first error-rate monitoring unit, and a transmitting level of the second optical transmitting unit is controlled such that the transmitting level is increased or decreased based on monitored results from the second error-rate monitoring unit.

6. The single-wire bi-directional transmission method according to claim 5, wherein the first signal light and the second signal light respectively are wavelength multiplexed signal lights each comprising a plurality of signal lights each having a different wavelength.

7. The single-wire bi-directional transmission method according to claim 6, wherein the first Raman pump light and the second Raman pump light respectively comprise a plurality of Raman pump lights each having a different wavelength.

8. The single-wire bi-directional transmission method according to claim 7, wherein the plurality of Raman pump lights forming the first Raman pump light and the second Raman pump light, are polarized and combined to be injected into said optical-fiber transmission-line, respectively.

* * * * *